Inventors
Fred G. Turnbull
Paul M. Espelage
by Donald R. Campbell
Their Attorney Inventors
Fred G. Turnbull
Paul M. Espelage
by Donald R. Campbell
Their Attorney

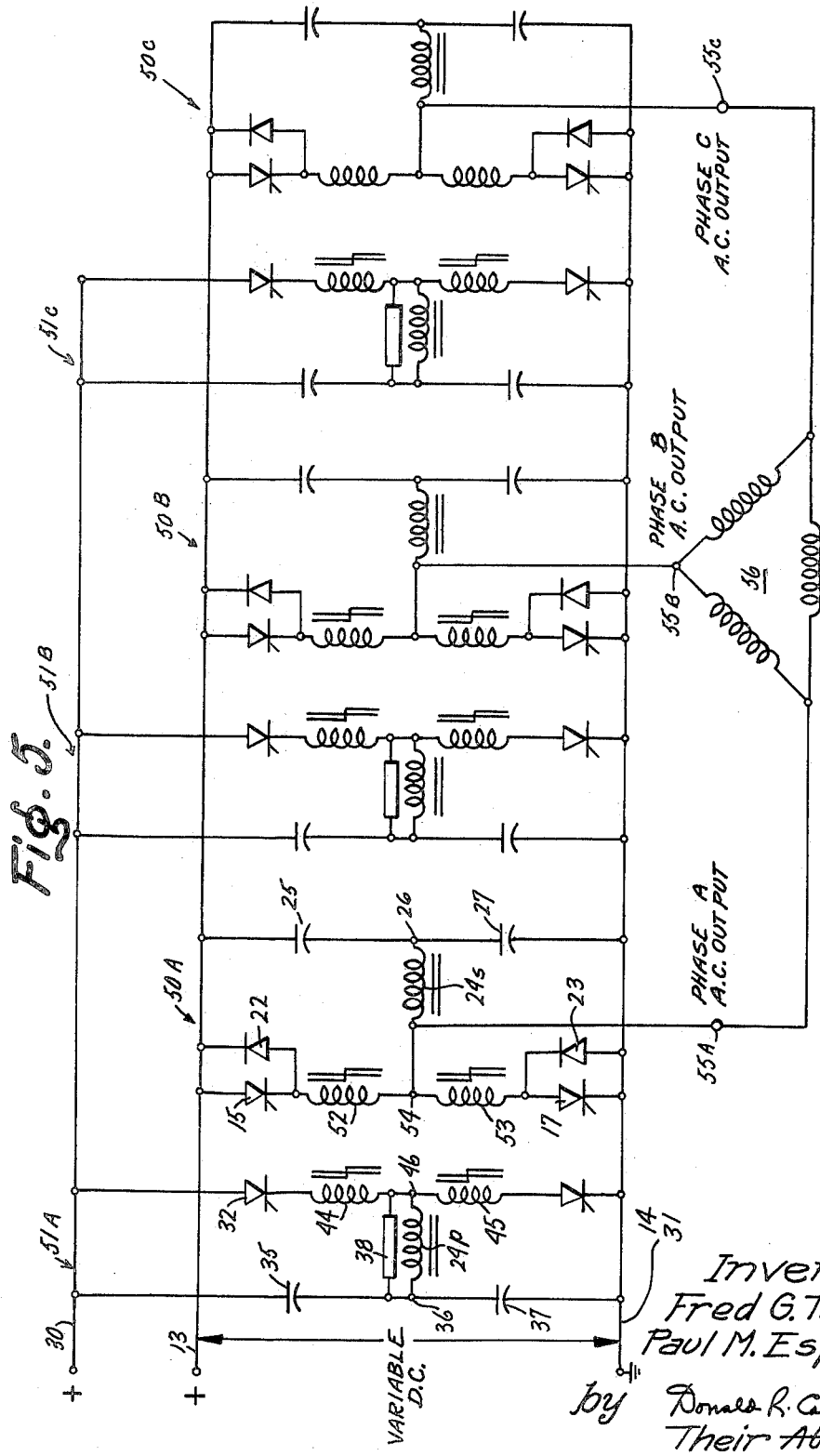

United States Patent Office 3,487,278
Patented Dec. 30, 1969

3,487,278
AUXILIARY INVERTER FOR GENERATING COMMUTATING PULSES FOR A LOAD INVERTER
Fred G. Turnbull, Scotia, and Paul M. Espelage, Ballston Lake, N.Y., assignors to General Electric Company, a corporation of New York
Filed Oct. 31, 1967, Ser. No. 679,298
Int. Cl. H02p 5/40
U.S. Cl. 318—227                                        7 Claims

ABSTRACT OF THE DISCLOSURE

A load inverter having a variable D-C supply comprises a pair of silicon controlled rectifiers each having a commutation circuit which includes the secondary winding of a linear coupling transformer. Commutation pulses of constant or predetermined magnitude are induced in the coupling transformer to commutate off the thyristors by means of an auxiliary commutating pulse generating inverter which comprises a series capacitor commutated inverter having in circuit the primary winding of the coupling transformer. Reliable commutation is achieved over a wide range of output voltages, and the inverter or other power control circuit can be designed in a variety of single or polyphase configurations.

---

This invention relates to inverters employing thyristors as the switching devices, and more particularly to static inverter circuits in which an auxiliary inverter is used as a source of commutating current pulses for a load inverter. These inverters are especially advantageous to produce reliable commutation for the thyristors when a variable D-C voltage supply for the load inverter is employed to produce a wide range of output voltage.

There are some inverter applications in which it is desired to obtain a variable output voltage having a reasonably useful range of about 10 to 1 or more. One such application is in providing a variable speed drive for an alternating current motor wherein the voltage and frequency of the supply to the motor are changed to vary the speed of the motor. In order to obtain a variable inverter output voltage, it is desirable to use an inverter having a variable D-C supply voltage, since in this manner it is possible to produce a wide range of output voltage without an increase in the harmonic content. Standard commutation techniques for the nongate turn-off thyristors cannot be used effectively in an inverter having a variable D-C supply, however. This is because in most standard inverters a commutating capacitor is charged to a value related to the D-C supply voltage for the inverter in order to commutate off the thyristor devices used to switch the direction of the current supplied to the load. As the D-C supply voltage is reduced, the amount of available commutating energy is also reduced. This presents no problem for the standard inverter which uses a fixed D-C supply voltage or one which varies over a narrow range. When using a variable D-C supply having a wider range of voltage in an inverter for producing a wide range of output voltage, it is seen that if a standard commutating circuit is designed for the maximum value of the D-C supply, then there will be insufficient commutating energy for the minimum D-C supply voltage. If on the other hand the commutating circuit is designed for the minimum D-C supply voltage, then it is either oversized for the maximum voltage or the ratings of the thyristors may be exceeded. Consequently, some other commutation technique is needed in which the available commutating energy is independent of the variable D-C supply for the inverter.

Accordingly, an object of the invention is to provide a new and improved power control circuit for producing a wide range of output voltages wherein reliable commutation is assured for the nongate turn-off thyristors employed as the switching devices in the power control circuit.

Another object is the provision of a new and improved inverter circuit which is operative with a variable D-C supply voltage to produce a usefully wide range of output voltages having a ratio of about ten to one or greater.

Yet another object is to provide a new and improved inverter wherein an auxiliary commutating pulse generating inverter is used as a source of commutating current pulses for a load inverter which operates from a fixed or variable D-C supply voltage, whereby reliable and efficient commutation is produced.

In accordance with the invention, an inverter circuit for wide range voltage control comprises load inverter means for producing a variable A-C output voltage from a variable D-C voltage source which includes at least a pair of load current carrying thyristor devices which are rendered conductive substantially alternately and are coupled across a first pair of D-C power supply terminals which in turn are adapted to be connected across the variable source of D-C voltage. The load inverter means further includes commutation circuit means for rendering each respective thyristor device nonconductive after a desired period of conduction. High frequency commutating pulse generating means are provided for producing commutation pulses of opposite polarity when it is desired to commutate off the respective thyristor devices in the load inverter means. This pulse generating means is preferably a series capacitor commutated sine wave auxiliary inverter, and is connected across a second pair of D-C supply terminals which in turn are adapted to be connected across a source of electric potential, preferably a fixed source or a source having regulation. High frequency linear coupling transformer means couples together the commutation pulse generating means and the load inverter commutation circuit means so that commutation pulses of each polarity generated by the commutation pulse generating means are transformer coupled into the load inverter commutation circuit means to produce predetermined commutation currents which respectively flow in the opposite directions to assure reliable commutation of the respective thyristor devices over the range of output voltage.

The foregoing and other objects, features and advantages of the invention will be apparent from the following more particular description of several preferred embodiments of the invention, as illustrated in the accompanying drawings wherein:

FIG. 5 is a schematic circuit diagram of a three-phase inverter employing three of the single phase inverters shown in FIG. 1 for use as a variable speed drive of a three-phase A-C motor.

Figure 1:
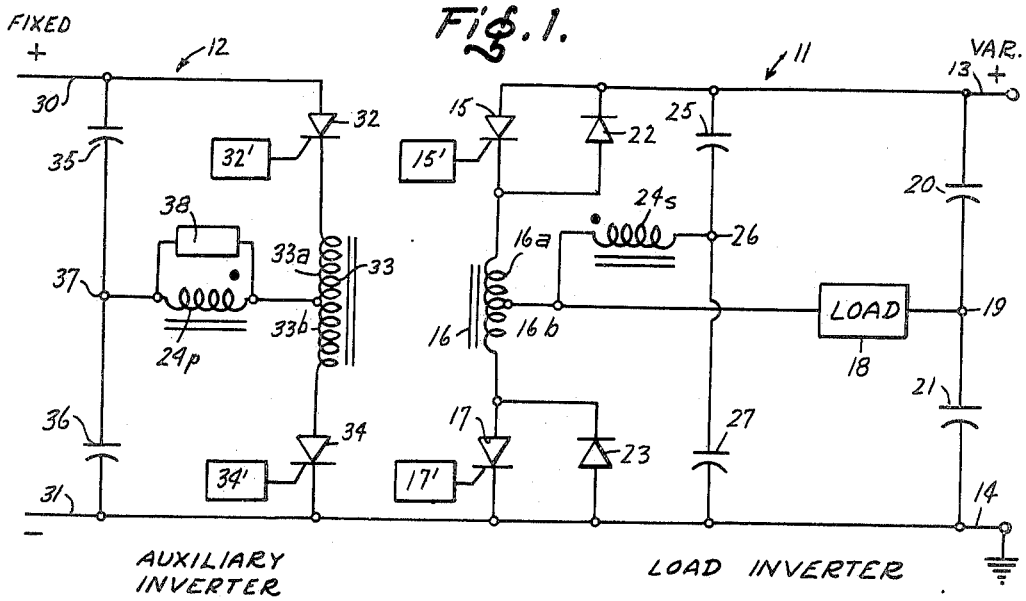
FIG. 1 is a schematic circuit diagram of an inverter circuit according to the teaching of the invention which comprises the combination of a load inverter and a commutating pulse generating inverter in the single phase half bridge configuration.

Referring to FIG. 1, the inverter circuit according to the invention comprises the combination of a main load inverter 11 with which is coupled an auxiliary commutating pulse generating inverter 12. Both of the inverters 11 and 12 use thyristors as the current switching devices. The load inverter 11 utilizes a variable D-C source of electric potential to produce an A-C output voltage which is variable over a wide range of about 10 to 1 or greater. A pair of direct current supply terminals 13 and 14 are connected across a variable direct current supply source preferably provided by a time ratio control circuit operating from a battery source, however various types of phase controlled rectifiers connected to a fixed A-C source can also be used, or ordinary rectifiers which operate from a variable A-C source. The supply terminal 13 is positive with respect to the other supply terminal 14, which is preferably at ground. Connected across the direct current supply terminals 13 and 14 is the series combination of a first silicon controlled rectifier 15, a commutating inductor 16, and a second silicon controlled rectifier 17. The silicon controlled rectifier is also known as a gate controlled thyristor and is a solid state device wherein conduction through the device can be initiated by the application of a gating signal to its gating control electrode, but thereafter the gating signal loses control over conduction through the device and it is rendered nonconductive or commutated off by reducing the current through the device below the holding current or by reducing the anode potential relative to the cathode potential to reverse bias the device. The commutating inductor 16 is center-tapped, and a load 18 is connected between the center tap and the junction point 19 between a pair of voltage dividing capacitors 20 and 21 which are connected in series circuit relationship across the direct current supply terminals 13 and 14. The load is a resistive load, but it will be understood this inverter operates similarly with the leading or lagging power factor loads. Suitable gating circuits 15' and 17' are provided for the respective load current carrying silicon controlled rectifiers 15 and 17 for gating them alternately or substantially alternately into conduction to supply current to the load 18 first in one direction, and then in the other direction, however these gating circuits are not illustrated in detail here because they are conventional. Suitable gating circuits which may be used are described for instance in the Silicon Controlled Rectifier Manual, 4th Edition, published by the Semiconductor Products Department, General Electric Company, Syracuse, N.Y., copyright 1967.

A feedback diode 22 is connected in inverse parallel relationship across the load terminals of the first SCR 15, and in similar fashion a feedback diode 23 is connected across the load terminals of the other SCR 17. The feedback diodes 22 and 23 provide a path for circulation of current after the SCR 15 or the SCR 17 has been commutated off when the load 18 is a reactive load. These feedback diodes also form a part of the commutating circuits for turning off the thyristors 15 and 17 after a desired period of conduction. In addition to the feedback diode 22, the commutating circuit for the SCR 15 includes the inductor half 16a, the secondary winding 24s of a high frequency linear coupling transformer, and a capacitor 25. Commutating current also flows through the closed loop including another capacitor 27 and the D-C source. The secondary winding 24s of the coupling transformer is connected between the center tap of the commutating inductor 16 and the junction point 26 between the capacitor 25 and another similar capacitor 27 which are connected together in series circuit relationship across the direct current supply terminals 13 and 14. As will be explained in greater detail hereinafter, a commutating current pulse is produced by the commutating pulse generating inverter 12 and induced by transformer action into the secondary winding 24s of the high frequency coupling transformer when it is desired to commutate off the SCR 15 after a desired period of conduction. The commutating circuit for the SCR 17 includes the aforementioned feedback diode 23, the inductor half 16b, the coupling transformer secondary winding 24s, and the capacitor 27. There is also commutating current flow through the loop including capacitor 25 and the D-C source.

The auxiliary commutating pulse generating inverter 12 is a high frequency series capacitor commutated inverter which preferably has a fixed D-C voltage source such as a battery source, although a voltage source having regulation can also be used as will be discussed later. A positive D-C supply terminal 30 and a negative D-C supply terminal 31 are connected across the fixed D-C source. The negative supply terminal 31 is preferably at ground and is coupled with the ground terminal 14 of the load inverter 11. Across the D-C supply terminals 30 and 31 are connected the series combination of a first auxiliary SCR 32, a commutating inductor 33, and a second auxiliary SCR 34. A pair of commutating capacitors 35 and 36 are also connected in series circuit relationship across the D-C supply terminals 30 and 31. The primary winding 24p of the high frequency coupling transformer is connected directly between the center tap of the commutating inductor 33 and the junction point 37 of the two commutating capacitors 35 and 36. A critical damping resistor 38 is connected across the coupling transformer primary winding 24p for a purpose to be explained later.

Let it first be assumed that both of the auxiliary SCR's 32 and 34 are turned off and that a gating signal from the gating circuit 32' is applied to the first auxiliary SCR 32 to render it conductive. Because of the nature of the series resonant circuit which is energized, a half-sinusoidal pulse of current flows through the SCR 32, the inductor half 33a, and the coupling transformer primary winding 24p, and divides equally into the adjacent plates of the commutating capacitors 35 and 36. The commutating capacitor 36 is charged by the current from the D-C source, while the charge on the other commutating capacitor 35 accumulated during a previous half cycle of operation is discharged through the primary winding 24p of the coupling transformer. At the termination of this half sine wave of current, the current through the SCR 32 drops below the holding value and the voltage at the junction point 37 between the commutating capacitors rises above the D-C supply voltage and reverse biases the SCR 32 so that it turns off. On the other half cycle of the commutating pulse generating inverter 12 when the second auxiliary SCR 34 is gated on by the gating circuit 34', the auxiliary inverter circuit operates in mirror-image fashion. Thus, a negative going half sinusoidal current pulse is produced in the circuit comprising the primary winding 24p of the coupling transformer, the inductor half 33b, and the auxiliary SCR 34. The commutating capacitor 35 is charged in a negative direction by the current from the D-C source, while the other commutating capacitor 36 discharges through the circuit just described.

Figure 2:
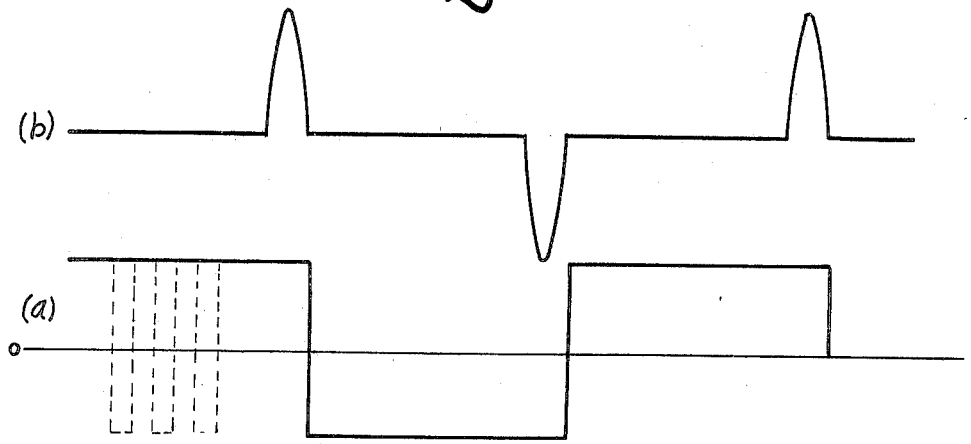
FIGS. 2a and 2b are characteristic waveforms respectively of the load current supplied to a resistive load by the load inverter and of the commutating pulses produced in the commutating pulse generating inverter.

The manner in which the auxiliary or commutating pulse generating inverter 12 is used as a source of commutating current pulses for the load inverter 11 will be explained with reference to the waveforms shown in FIGS. 2a and 2b. In any one cycle of operation, the variable D-C voltage source is adjusted to give the desired output voltage. The load inverter 11 is a square wave inverter and produces a square wave of current through the load 18 as shown in FIG. 2a. Upon turning on the first SCR 15, current flows through this SCR, which is now in a low impedance condition, and through the inductor half 16a to the load 18. When it is desired to render the SCR 15 non-conductive and place it in a high impedance condition blocking the flow of currtnt, the first auxiliary SCR 32 in the commutating pulse generating inverter 12 is rendered conductive. A half sine wave of current is produced in the primary winding 24p of the coupling transformer as shown in FIG. 2b, and depending on the turns ratio between the turns in the secondary winding 24s and the turns in the primary winding 24p of the coupling transformer, a commutating current pulse of the same or a different amplitude is produced in the secondary winding 24s of the coupling transformer. The polarity of the voltage in the primary and secondary windings is positive at the dot ends of the windings. The commutating current pulse flows through the inductor half 16a and opposes the load current in the SCR 15, and when the flow of current through the SCR 15 has dropped to zero and current begins to flow through the feedback diode 22, the current flowing in the feedback diode 22 reverse biases the SCR 15, turning it off. The circiut for the commutating current pulse is completed through the capacitor 25, and through capacitor 27 and the source.

The second SCR 17 is triggered on to initiate the second half cycle of operation of the load inverter 11. Since the junction point 19 between the voltage dividing capacitors 20 and 21 is positive with respect to the negative D-C supply terminal 14, current flows in the opposite direction through the load 18, the inductor half 16b, and the now conducting SCR 17. To initiate commutation of the SCR 17, the second auxiliary SCR 34 in the commutating pulse generating inverter 12 is gated on, thereby producing a negative going commutating pulse in the primary winding 24p of the coupling transformer which is induced in the secondary winding 24s in such a direction that the commutating current pulse flows in the opposite direction through the SCR 17 opposing the load current. Upon rendering conductive the feedback diode 23, the voltage drop in this diode reverse biases the SCR 17, completing the commutation. Resistor 38 acts as a critical damping resistor to reduce oscillations occurring between capacitors 25 and 27 and the open circuit inductance of the coupling transformer comprising windings 24p and 24s.

As has been mentioned, the source of D-C supply voltage for the square wave load inverter is adjustable in order to control the A-C output voltage. By generating the commutating current pulses in the auxiliary inverter 12, which is connected across a fixed D-C source, the amount of available level even though the D-C supply for the load inverter 11 is adjustable to control the A-C output voltage, there is always sufficient commutating energy to produce reliable commutation of the thyristors in the load inverter. At low output voltages there is reliable commutation without over-designing the commutation circuit or exceeding the ratings of the thyristors when the output voltage is high. It is desirable to use a variable D-C source for the load inverters since in this manner it is possible to achieve a wide range of output voltage without an increase in harmonic content. By the use of the commutation technique according to the teachings of the invention, a wide range of output voltage control as high as 20 to 1 or 30 to 1 is possible.

It will be noted from the characteristic waveforms shown in FIGS. 2a and 2b that the repetition rate of the A-C output voltage and of the commutating current pulses is the same. This is necessary, of course, since each time the first load current SCR 15 is turned on, the first auxiliary SCR 32 must also be turned on in order to commutate it off. In the same manner, the second auxiliary SCR 34 is turned on each time that the other load current SCR is rendered conductive in order to commutate it off. It is desirable, however, that the pulse width of the commutating current pulses be relatively narrow as compared to the corresponding half wave of the output voltage. That is to say, the auxiliary inverter 12 is a high frequency inverter as compared to the load inverter 11. By designing the series resonant circuits in the auxiliary inverter 12 such that it is relatively high frequency and the commutating current pulses produced by it are relatively narrow, it is possible to vary both the frequency and the magnitude of the A-C output voltage. The ability to vary both the output voltage and its frequency is desirable in inverter application (ordinarily a three-phase inverter rather than a single phase inverter) in which it is used as a variable speed drive for an alternating current motor.

In such a case, both the voltage and the frequency are varied to change the speed of the motor while maintaining constant flux in the machine. In addition, in any one half cycle of operation, the load thyristors 15 and 17 may be turned on and off rapidly to achieve internal chopping for voltage control. This is shown in dotted lines in FIGS. 2a where the ratio of the "on" time of the thyristor is selected with respect to the "off" time to achieve, in any one half cycle of operation, a desired output voltage in accordance with time ratio control principles. In this mode of operation, the output voltage supplied to the load decreases as the amount of "on" time is decreased. Since the load current carrying thyristors 15 and 17 can be controlled independently, the output voltage in succeeding half cycles can be different to result in supplying a net D-C current to the load. For some types of loads this may be desirable.

Another advantage of the new and improved inverter circuit is that isolation between the commutating pulse generating circuit and the main power circuit is achieved by the use of the high frequency coupling transformer. The D-C supply for the commutating pulse generating inverter 12 and the variable D-C supply for the load inverter 11 share a common ground terminal in FIG. 1, but complete isolation can be provided if desired. Isolation of the two D-C power supplies increases the reliability of the system by allowing the commutating pulse generating inverter 12 to operate even when the voltage supply for the load inverter 11 is shorted. Furthermore, the use of the isolated commutating pulse generating inverter 12 as a source of commutating pulses decreases the control precision required for step loading, starting, and wide power factor load. These advantages apply as well where the D-C supply for the load inverter 11 is not adjustable and the inverter has a constant output voltage.

Figure 3:
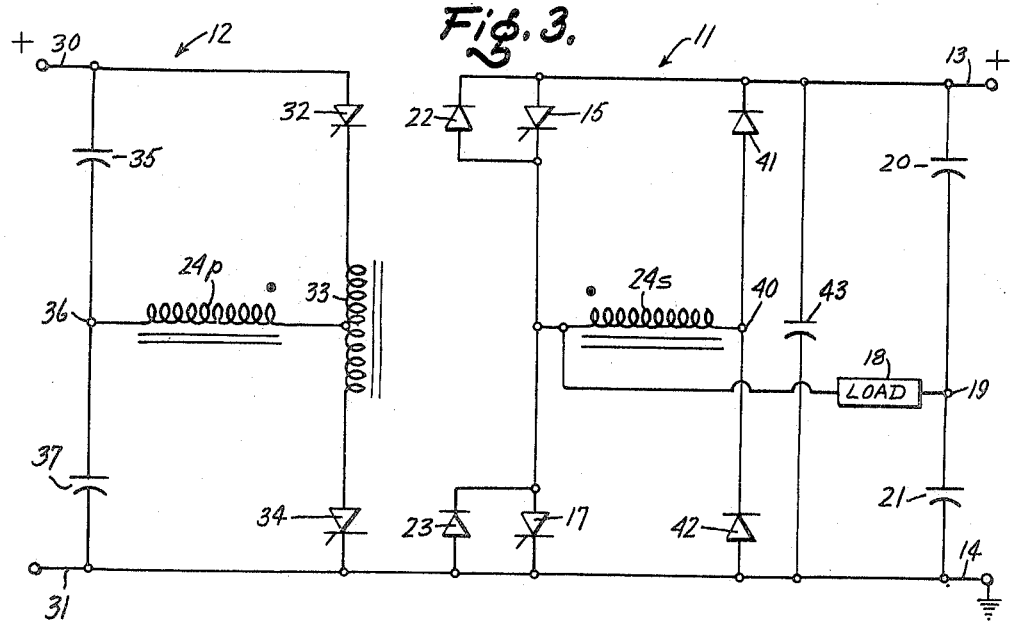
FIG. 3 is a schematic circuit diagram of another embodiment of the invention similar to FIG. 1.

FIG. 3 shows another embodiment of the invention which may be preferred under certain load conditions. In this circuit the one end of the secondary winding 24s of the coupling transformer is connected to the junction point 40 between a pair of blocking diodes 41 and 42 connected in series circuit relationship across the D-C supply terminals 13 and 14 of the load inverter 11. The other end of secondary winding 24s is connected directly to the junction point between the series-connected main SCR's 15 and 17. The circuit for the commutating pulses is completed by a capacitor 43 connected directly across the supply terminals 13 and 14. With this arrangement, the diodes 22 and 42 are rendered conductive when the commutating current pulse produced by the commutating pulse generating inverter 12 is of such polarity that the polarity of the induced voltage in the secondary winding 24s of the coupling transformer is positive at the dot end of the winding. The voltage on the secondary winding 24s is clamped at the D-C supply voltage appearing in the supply terminals 13 and 14 by the clamping action of the capacitor 43, which provides a path for the commutating current. When the auxiliary inverter 12 produces a commutating current pulse which is of the opposite polarity so that the voltage induced in the secondary winding 24s is positive at the no-dot end of the winding, the diodes 23 and 41 are rendered conductive, and the circuit for the commutating current pulse is completed through the capacitor 43. Otherwise the operation of the circuit of FIG. 3 is the same as the FIG. 1 circuit and no further description is believed to be necessary. The use of the second set of diodes 41 and 42 eliminates the need for the center-tapped capacitors 25 and 27 in FIG. 1 and the damping resistor 38 that was required to reduce the oscillations occurring between these capacitors and the open circuit inductance of the coupling transformer.

Figure 4:
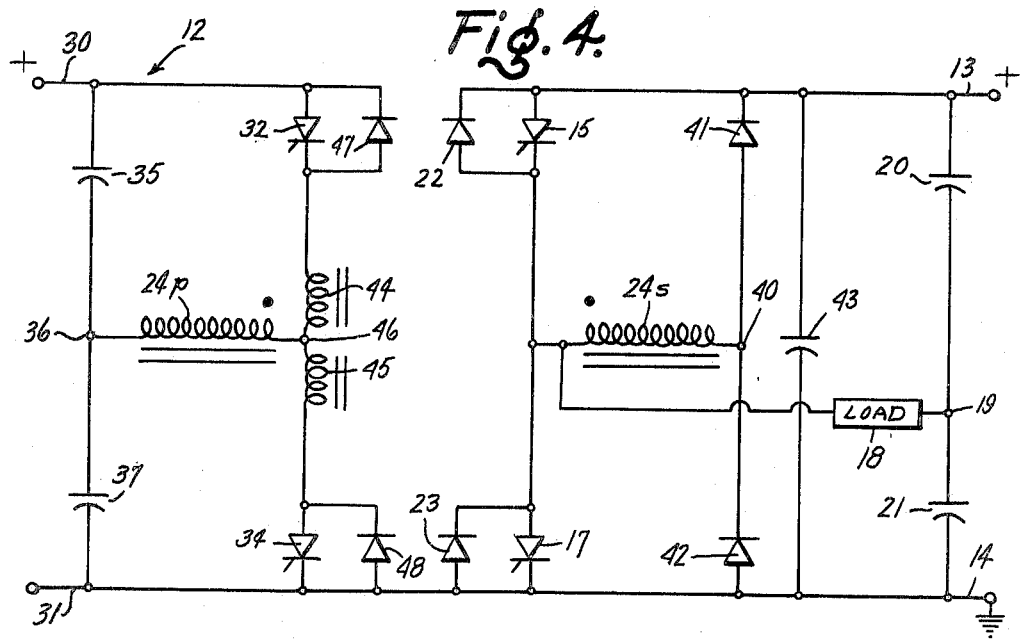
FIG. 4 is a variation of the circuit shown in FIG. 3.

The inverter circuit illustrated in FIG. 4 employs a load inverter 11 of the type shown in FIG. 3, however the commutating pulse generating inverter 12 is somewhat different from those previously described. Instead of using a single center-tapped commutating inductor 33, this high frequency sine wave inverter has two separate commutating inductors 44 and 45 whose junction point 46 is connected to the one end of the primary winding 24p of the coupling transformer. In addition, feedback diodes 47 and 48 are connected in inverse parallel relationship across the load terminals of the respective auxiliary SCR's 32 and 34. By adding the feedback diodes 47 and 48 there is a path for a second half sinusoid of current in each half cycle of the operation of the series capacitor commutated inverter which flows through the feedback diode. Thus, when the first auxiliary SCR 32 is rendered conductive, there is a half sine wave of current which drops to zero as the junction point 36 of the commutating capacitors 35 and 37 rises to a potential greater than the D-C supply voltage. Because of the inherent nature of the series resonant circuit, another half sine wave flows in the opposite direction through the coupling transformer primary winding 24p, the commutating inductor 44, and the feedback diode 47. The current flowing through the feedback diode 47 reverse biases the auxiliary SCR 32 allowing it to regain its ability to block forward voltage. At the same time charge is removed from the adjacent plates of the commutating capacitors 35 and 37. This removal of current from the series connected commutating capacitors allows this circuit to operate with a shorted transformer or load since the capacitor voltage does not gradually build up, as in the case of the previous auxiliary inverter circuits, but rather stabilizes as the result of the addition of the feedback diodes to the circuit. The second half sinusoid of current which is produced to cause current flow in the respective feedback diodes has no effect in the load inverter circuit 11, since both of the load current carrying SCR's 15 and 17 are already commutated off.

In the inverter circuits of FIGS. 1, 3, and 4, both the load inverter 11 and the auxiliary commutating pulse generating inverter 12 in each of the circuits is shown in the familiar single phase half bridge configuration. In any of the circuits, both of the inverters can be redrawn in the full wave bridge and three-phase configurations. For example, the three-phase inverter shown in FIG. 5 comprises three single phase inverters which are essentially the type shown in FIG. 1. The three single phase load inverters are identified as 50A, 50B, and 50C, while the three corresponding single phase auxiliary commutating pulse generating inverters are identified as 51A, 51B, and 51C. The three load inverters are connected across a common positive D-C supply terminal 13 and a common negative D-C supply terminal identified as 14, 31, which is preferably at ground potential. Three auxiliary commutating pulse generating inverters are connected across this common D-C supply terminal 14, 31 and a common positive D-C supply terminal 30. In an actual working inverter the D-C supply connected to the positive supply terminal 30 for the auxiliary commutating pulse generating inverters need not be an absolutely fixed D-C supply source as has been described with regard to the other embodiments. This D-C supply may be varied within prescribed limits or be a D-C supply with poor regulation and still produce desirable results in this inverter circuit. In this case the commutating current supplied to the load inverter is not fixed, but varies within predetermined levels, and filters can be employed if desired.

In the single phase load inverter 50A, the individual components which correspond to the components shown in the load inverter 11 in FIG. 1 have been given the same reference numerals, and it will be noted that the center-tapped commutating inductor 16 in FIG. 1 has been replaced by individual commutating inductors 52 and 53 and that the end of the coupling transformer secondary winding 24s is connected to the junction point 54 between these two individual inductors. The commutating inductors 52 and 53 may if desired have saturable cores. The individual components of the commutating pulse inverter 51A which correspond to the components of the auxiliary inverter 12 in FIG. 1 are identified by the same reference numeral, and it will be noted that the separate commutating inductors 44 and 45 have been used. These may also have saturable cores.

The outputs of the three single phase load inverters 50A, 50B, and 50C appear respectively at the terminals 55A, 55B, and 55C. One application for this three-phase inverter is as a variable speed drive for a three-phase alternating current motor. As is shown, the junction points of the delta-connected windings of a three-phase A-C motor 56 are connected respectively to the output terminals 55A, 55B, and 55C of the inverter. The three-phase inverter is operated in the usual manner to energize the windings of the motor 56. As a specific example of the wide range voltage control which can be secured, the D-C supply for the load inverter connected to the positive D-C supply terminal 13 is a time ratio control circuit having an output which is variable between zero and 330 volts D-C. For this example the D-C supply for the commutating pulse generating inverters connected to the positive D-C supply terminal 30 is a bank of fuel cells having an output voltage which varies from 330–420 volts D-C. The range of control of the output of this inverter is easily as much as 20 to 1, and can be used for driving the A-C motor in an electric vehicle.

In summary, the A-C output voltage of an inverter circuit can be controlled over a wide range which easily exceeds a ratio of 10 to 1 by using a variable source of D-C voltage for the load inverter 11. Reliable commutation of the nongate turnoff load current carrying thyristors in the load inverter is achieved because the source of commutating curent pulses in the form of the auxiliary inverter 12 provides a fixed or predetermined commutating current to the load inverter over the range of control of the variable D-C supply for the load inverter. Isolation between the source of commutating current pulses and the load inverter is achieved by the high frequency linear coupling transformer. Although especially useful as variable speed drives for A-C motors, these inverters have utility in other applications which require wide range voltage control.

While the invention has been particularly shown and described with references to several preferred embodiments thereof, it will be understood by those skilled in the art that various changes in form and details may be made therein without departing from the spirit and scope of the invention.

What we claim as new and desired to secure by Letters Patent of the United States is:

1. An inverter circuit for wide range voltage control which comprises load inverter means for producing a variable alternating current output voltage from a variable direct current voltage source comprising a pair of load current carrying thyristor devices which are rendered conductive substantially alternately and are coupled together in series circuit relationship across a first pair of direct current supply terminals which in turn are adapted to be connected across the variable source of direct current voltage, said load inverter means further including commutation circuit means for each of said thyristor devices for rendering the respective thyristor devices nonconductive after desired periods of conduction, high frequency auxiliary inverter means comprising a pair of auxiliary thyristor devices and commutating means therefor which are selectively rendered conductive for generating commutating pulses of opposite polarity when it is desired to commutate off the respective thyristor devices in the load inverter means after desired periods of conduction, said auxiliary inverter means being connected across a second pair of direct current supply terminals which in turn are adapted to be connected across a second source of direct current voltage, and high frequency linear coupling transformer means for coupling together said auxiliary inverter means and the commutation circuit means of said load inverter means so that commutation pulses of each polarity generated by said auxiliary inverter means are transformer coupled to the respective commutation circuit means of the load inverter means to produce predetermined commutation currents which respectively flow in the opposite directions to assure reliable commutation of the respective thyristor devices in the load inverter means over the range of output voltage, wherein said high frequency coupling transformer includes a primary winding in circuit with said auxiliary inverter means and a secondary winding included in the commutation circuit means of said load inverter means, and the commutation circuit means of said load inverter means further includes a feedback diode connected across the load terminals of each of the thyristor devices and a pair of series connected capacitors which are connected across the direct current supply terminals of the load inverter means and whose junction point is connected to one end of the secondary winding to complete a circuit for the commutating current pulses.

2. An inverter circuit for wide range voltage control which comprises load inverter means for producing a variable alternating current output voltage from a variable direct current voltage source comprising a pair of load current carrying thyristor devices which are rendered conductive substantially alternately and are coupled together in series circuit relationship across a first pair of direct current supply terminals which in turn are adapted to be connected across the variable source of direct current voltage, said load inverter means further including commutation circuit means for each of said thyristor devices for rendering the respective thyristor devices nonconductive after desired periods of conduction, high frequency auxiliary inverter means comprising a pair of auxiliary thyristor devices and commutating means therefor which are selectively rendered conductive for generating commutating pulses of opposite polarity when it is desired to commutate off the respective thyristor devices in the load inverter means after desired periods of conduction, said auxiliary inverter means being connected across a second pair of direct current supply terminals which in turn are adapted to be connected across a second source of direct current voltage, and high frequency linear coupling transformer means for coupling together said auxiliary inverter means and the commutation circuit means of said load inverter means so that commutation pulses of each polarity generated by said auxiliary inverter means are transformer coupled to the respective commutation circuit means of the load inverter means to produce predetermined commutation currents which respectively flow in the opposite directions to assure reliable commutation of the respective thyristor devices in the load inverter means over the range of output voltage, wherein said high frequency coupling transformer includes a primary winding in circuit with said auxiliary inverter means and a secondary winding included in the commutation circuit means of said load inverter means, and the commutation circuit means of said load inverter means further includes a feedback diode connected across the load terminals of each of the thyristro devices and a pair of series connected blocking diodes which are connected across the direct current supply terminals of the load inverter means and whose junction is connected to one end of the secondary winding, and a capacitor connected across the same direct current supply terminals to complete a circuit for the commutating current pulses.

3. An inverter circuit for wide range voltage control comprising a load inverter for producing a variable frequency, variable alternating current output voltage from a variable direct current voltage source comprising at least first and second alternately conductive load current carrying thyristors effectively coupled between a first pair of supply terminals that in turn are adapted to be connected across the variable source of direct current voltage, said load inverter further including gating means and also commutation circuit means for rendering nonconductive the respective load current carrying thyristors after desired periods of conduction, a high frequency auxiliary sine wave inverter for producing commutating current pulses of predetermined magnitude comprising at least first and second alternating conductive auxiliary thyristors effectively coupled in series circuit relationship between a second pair of supply terminals that are in turn adapted to be connected across a source of fixed or regulated direct current voltage, and commutating means for said auxiliary thyristors including a pair of commutating capacitors, said auxiliary sine wave inverter operating at a resonant frequency substantially higher than the variable output frequency of said load inverter, gating means for selectively rendering conductive said first and second auxiliary thyristors to charge a respective one of said commutating capacitors and simultaneously generate complete half sinusoidal commutating pulses of opposite polarity to initiate respectively the commutation of said first and second load current carrying thyristors in said load inverter after desired periods of conduction, and a single high frequency linear transformer for coupling together said auxiliary inverter and the commutation circuit means of said load inverter so that the half sinusoidal commutating pulses of each polarity generated by said auxiliary inverter are transformer coupled to the commutation circuit means of the load inverter to produce predetermined commutation currents which respectively flow in the opposite directions to assure reliable commutation of the respective load current carrying thyristors over the entire range of output voltage.

4. An inverter circuit according to claim 3 wherein the pair of commutating capacitors forming a part of said commutating means in said auxiliary sine wave inverter are connected in series circuit relationship between said second pair of supply terminals, and the aforementioned commutating means also includes commutating inductor means connected in series between said first and second auxiliary thyristors, and wherein said high frequency coupling transformer has a single primary winding connected between the junction of said commutating capacitors and the mid-point of said commutating inductor means.

5. An inverter circuit according to claim 4 wherein said high frequency coupling transformer has a single secondary winding connected to a junction between the load current carrying thyristors in said load inverter, and wherein the commutating circuit means in said load inverter includes a pair of capacitors connected in series between said first pair of supply terminals, the other end of said secondary winding being connected to the junction of said just mentioned capacitors, and feedback rectifiers connected arcoss each of said load current carrying thyristors.

6. An inverter circuit according to claim 4 wherein said high frequency coupling transformer has a single secondary winding connected to a junction between said load current carrying thyristors in said load inverter, and wherein
the commutating circuit means in said load inverter includes a pair of capacitors connected in series between said first pair of supply terminals, the other end of said secondary winding being connected to the junction between said pair of rectifiers, a capacitor further being connected between said first pair of supply terminals, and
a feedback rectifier connected across each of said load current carrying thyristors.

7. A three-phase inverter circuit including three of the single phase inverter circuits as defined in claim 4, wherein each of the single phase load inverters is connected between the first pair of supply terminals and each of the auxiliary inverters is connected between the second pair of supply terminals, and a three-phase alternating current motor interconnected between the junction points of the pair of load current carrying thyristors in each of the single phase inverter circuits, to thereby provide a variable speed drive for the alternating current motor.

References Cited

UNITED STATES PATENTS

| | | | |
|---|---|---|---|
| 3,286,155 | 11/1966 | Corey | 321—45 |
| 3,331,011 | 7/1967 | Landis | 321—45 XR |

ORIS L. RADER, Primary Examiner

GENE ROBINSON, Assistant Examiner

U.S. Cl. X.R.

321—45